(12) United States Patent
Riedel et al.

(10) Patent No.: US 11,931,677 B2
(45) Date of Patent: Mar. 19, 2024

(54) SEPARATION DEVICE AND METHOD TO SEPARATE CONTAMINANTS FROM CONTAMINATED WATER

(71) Applicant: Hydria Water AB, Borås (SE)

(72) Inventors: Andreas Riedel, Björketorp (SE); Mattias Ahlstrand, Väring (SE)

(73) Assignee: Hydra Water AB, Borås (SE)

( * ) Notice: Subject to any disclaimer, the term of this patent is extended or adjusted under 35 U.S.C. 154(b) by 0 days.

(21) Appl. No.: 17/161,751

(22) Filed: Jan. 29, 2021

(65) Prior Publication Data

US 2021/0236965 A1    Aug. 5, 2021

(30) Foreign Application Priority Data

Jan. 31, 2020 (SE) .................................. 2050106-0

(51) Int. Cl.
*B01D 29/94* (2006.01)
*B01D 21/24* (2006.01)
(Continued)

(52) U.S. Cl.
CPC ......... *B01D 29/94* (2013.01); *B01D 21/2461* (2013.01); *B01D 21/2472* (2013.01); *B01D 29/6415* (2013.01); *B01D 29/661* (2013.01); *B01D 29/824* (2013.01); *B01D 29/828* (2013.01); *B01D 29/86* (2013.01); *C02F 11/122* (2013.01); *C02F 11/125* (2013.01)

(58) Field of Classification Search
None
See application file for complete search history.

(56) References Cited

U.S. PATENT DOCUMENTS

| 641,266 | A | * | 1/1900 | Bussells | .................... | B30B 9/12 |
|---|---|---|---|---|---|---|
| | | | | | | 100/147 |
| 643,891 | A | * | 2/1900 | Bussells | .................... | B30B 9/12 |
| | | | | | | 100/147 |

(Continued)

FOREIGN PATENT DOCUMENTS

| CN | 106 365 403 A | 2/2017 |
|---|---|---|
| EP | 0927579 A2 | 7/1999 |

(Continued)

OTHER PUBLICATIONS

Hydria Water, Combi Unit CU, 4 pp, undated. (Year: 2023).*

(Continued)

*Primary Examiner* — Robert J Popovics
(74) *Attorney, Agent, or Firm* — Renner, Otto, Boisselle & Sklar, LLP (57) ABSTRACT

The present disclosure relates to a separation device to separate contaminants from contaminated water. It comprises a container to receive the contaminated water. The container further comprises a contaminated water inlet, a filter, a presser for compressing and/or dewatering contaminants separated from the contaminated water, and a contaminant outlet. The container further comprises a gas inlet for generating gas bubbles into the contaminated water to further separate contaminants from the contaminated water. The present disclosure relates to a use of such a separation device and a method of separating contaminants from contaminated water.

13 Claims, 6 Drawing Sheets

(51) Int. Cl.
*B01D 29/64* (2006.01)
*B01D 29/66* (2006.01)
*B01D 29/82* (2006.01)
*B01D 29/86* (2006.01)
*C02F 11/122* (2019.01)
*C02F 11/125* (2019.01)

(56) References Cited

U.S. PATENT DOCUMENTS

| | | | | |
|---|---|---|---|---|
| 675,179 A * | 5/1901 | Wacker | | B30B 9/12 100/147 |
| 793,267 A * | 6/1905 | Barth | | B04B 5/10 210/219 |
| 1,071,020 A * | 8/1913 | Bartholomew | | B30B 9/067 100/269.18 |
| 1,151,186 A * | 8/1915 | Johnson | | B30B 9/12 100/147 |
| 1,354,528 A * | 10/1920 | Wertenbruch | | B30B 9/128 100/74 |
| 1,716,228 A * | 6/1929 | Horne | | B01D 21/2433 209/208 |
| 1,772,262 A * | 8/1930 | Naugle | | B01D 29/828 210/488 |
| 2,276,075 A * | 3/1942 | Wuensch | | E21B 21/065 507/143 |
| 2,331,126 A * | 10/1943 | Loomis | | B30B 9/067 100/106 |
| 2,362,701 A * | 11/1944 | Koehring | | B30B 15/302 100/249 |
| 2,756,965 A * | 7/1956 | Howe | | E21B 21/063 209/208 |
| 2,830,530 A * | 4/1958 | Powell | | B30B 9/067 100/906 |
| 3,070,003 A * | 12/1962 | Stacy | | B30B 9/04 425/149 |
| 3,115,458 A * | 12/1963 | Bebech | | B01D 29/15 210/138 |
| 3,121,680 A * | 2/1964 | Ciabattari | | B01D 21/0042 210/205 |
| 3,168,033 A * | 2/1965 | Hansen | | B30B 9/067 100/249 |
| 3,285,415 A * | 11/1966 | Walker | | B01D 21/20 210/768 |
| 3,482,700 A * | 12/1969 | Bebech | | B01D 29/72 210/407 |
| 3,544,369 A * | 12/1970 | Keogh, Jr. | | C23G 3/00 134/13 |
| 3,552,031 A * | 1/1971 | Evans et al. | | C10F 5/00 34/349 |
| 3,580,166 A * | 5/1971 | Longo | | B09B 3/20 53/529 |
| 3,639,172 A * | 2/1972 | Keogh, Jr. | | B23Q 11/0057 134/40 |
| 3,679,056 A * | 7/1972 | Haymore | | B03D 1/1431 210/221.2 |
| 3,688,686 A * | 9/1972 | Ligh | | B30B 9/3007 100/215 |
| 3,710,941 A | 1/1973 | Brociner | | |
| 3,726,402 A * | 4/1973 | Goutos | | B01D 29/41 210/138 |
| 3,786,923 A * | 1/1974 | Schmidt | | C02F 1/28 210/397 |
| 3,796,316 A * | 3/1974 | Matz | | B01D 29/52 100/116 |
| 3,802,566 A * | 4/1974 | Hata | | B01D 29/828 210/383 |
| 3,865,727 A * | 2/1975 | Broling | | B01D 29/6476 210/162 |
| 3,966,617 A * | 6/1976 | Zaenkert | | B01D 21/14 210/519 |
| 3,997,441 A * | 12/1976 | Pamplin, Jr. | | B01D 37/02 210/791 |
| 4,062,776 A * | 12/1977 | Blok | | B01D 33/50 210/403 |
| 4,160,732 A * | 7/1979 | Maffet | | B01D 29/25 210/780 |
| 4,165,283 A * | 8/1979 | Weber | | B01D 21/283 210/111 |
| 4,175,039 A * | 11/1979 | Fisher | | B01D 21/24 134/25.1 |
| 4,208,188 A * | 6/1980 | Dick, Jr. | | C10L 5/02 44/636 |
| 4,214,377 A * | 7/1980 | Maffet | | F26B 5/14 210/767 |
| 4,237,618 A * | 12/1980 | Maffet | | B30B 9/12 100/117 |
| 4,244,287 A * | 1/1981 | Maffet | | C02F 11/125 100/41 |
| 4,285,140 A * | 8/1981 | van Raam | | C10L 9/00 34/403 |
| 4,343,233 A * | 8/1982 | Burgin | | B30B 9/042 100/48 |
| 4,346,653 A * | 8/1982 | Rodak | | B09B 3/20 100/249 |
| 4,347,137 A * | 8/1982 | Dick, Jr. | | B30B 9/06 210/329 |
| 4,371,376 A * | 2/1983 | Dick, Jr. | | B30B 9/265 44/636 |
| 4,387,633 A * | 6/1983 | Ballantyne | | B30B 9/06 100/48 |
| 4,389,928 A * | 6/1983 | Burgin | | B30B 9/12 100/37 |
| 4,410,433 A * | 10/1983 | Arvanitakis | | B01D 37/02 210/111 |
| 4,501,539 A * | 2/1985 | Fenton, Jr. | | B30B 9/06 425/84 |
| 4,525,284 A * | 6/1985 | Saalasti | | B01D 33/04 210/780 |
| 4,636,308 A * | 1/1987 | Summers | | E21B 21/063 210/523 |
| 4,646,633 A * | 3/1987 | Falguieres | | B30B 9/062 100/37 |
| 4,741,836 A * | 5/1988 | Jackman | | C02F 11/125 210/729 |
| 4,750,274 A * | 6/1988 | Erdman, Jr. | | F26B 3/205 34/182 |
| 5,001,975 A * | 3/1991 | Finden | | B30B 15/34 100/319 |
| 5,146,848 A * | 9/1992 | Dufour | | B30B 9/321 100/244 |
| 5,207,907 A * | 5/1993 | DeLons | | B01D 33/646 100/118 |
| 5,236,583 A * | 8/1993 | Wang | | B01D 29/6484 204/157.42 |
| 5,263,411 A * | 11/1993 | Gourdol | | B30B 9/067 100/249 |
| 5,271,851 A * | 12/1993 | Nelson | | B01D 37/02 210/328 |
| 5,366,626 A * | 11/1994 | Pierson | | B01D 29/09 210/216 |
| 5,425,188 A * | 6/1995 | Rinker | | B01D 46/0002 175/206 |
| 5,435,917 A * | 7/1995 | Sato | | B01D 33/11 209/288 |
| 5,558,764 A | 9/1996 | Romo | | |
| 5,645,614 A * | 7/1997 | Dummersdorf | | C02F 11/12 44/589 |
| 5,676,827 A * | 10/1997 | Bruke | | B01D 21/2461 198/662 |
| 5,770,094 A * | 6/1998 | Garton | | B01D 29/6415 210/791 |
| 5,862,746 A * | 1/1999 | Bielfeldt | | C10L 9/00 100/92 |
| 5,863,429 A * | 1/1999 | Bahr | | B01D 25/30 100/118 |
| 5,887,514 A * | 3/1999 | Bielfeldt | | B28B 13/027 100/41 |

(56) References Cited

U.S. PATENT DOCUMENTS

| | | | | |
|---|---|---|---|---|
| 5,900,139 A * | 5/1999 | Bielfeldt | B30B 9/105 | 100/118 |
| 5,961,827 A * | 10/1999 | Bahr | B01D 29/6438 | 210/387 |
| 6,059,977 A * | 5/2000 | Rowney | B01D 21/0042 | 210/801 |
| 6,110,388 A * | 8/2000 | Norais | B01D 29/05 | 210/791 |
| 6,193,070 B1 * | 2/2001 | Rowney | E21B 21/065 | 209/208 |
| 6,256,902 B1 * | 7/2001 | Flaherty | F26B 17/101 | 34/387 |
| 6,395,187 B1 * | 5/2002 | Alanis | B01D 29/6484 | 100/145 |
| 6,461,523 B1 * | 10/2002 | Greenrose | B01D 29/56 | 210/780 |
| 6,506,310 B2 * | 1/2003 | Kulbeth | B01D 21/02 | 210/780 |
| 6,551,516 B1 * | 4/2003 | Castleberry | B01D 21/2433 | 210/776 |
| 6,572,763 B2 * | 6/2003 | Gorshing | B01D 29/115 | 210/162 |
| 6,615,710 B1 * | 9/2003 | Ishigaki | B01D 37/04 | 100/48 |
| 6,634,508 B1 * | 10/2003 | Ishigaki | B01D 33/72 | 210/414 |
| 6,651,822 B2 * | 11/2003 | Alanis | B01D 29/6476 | 100/145 |
| 6,673,247 B2 * | 1/2004 | Olson | C02F 11/148 | 210/764 |
| 6,676,833 B2 * | 1/2004 | Castleberry | B01D 21/04 | 210/776 |
| 6,685,830 B2 * | 2/2004 | Hartleitner | B01D 21/2433 | 210/388 |
| 6,706,199 B2 * | 3/2004 | Winter | C10J 3/485 | 48/DIG. 2 |
| 6,749,783 B2 * | 6/2004 | Everett | B28B 15/002 | 425/149 |
| 6,780,147 B2 * | 8/2004 | Koch | B04B 1/20 | 494/53 |
| 6,790,169 B2 * | 9/2004 | Koch | B04B 11/06 | 494/53 |
| 6,808,626 B2 * | 10/2004 | Kulbeth | B01D 21/267 | 209/172.5 |
| 6,899,807 B2 * | 5/2005 | Cummings | B01D 29/01 | 210/531 |
| 7,005,077 B1 * | 2/2006 | Brenner | B63J 4/006 | 4/DIG. 9 |
| 7,018,326 B2 * | 3/2006 | Koch | B04B 1/20 | 494/53 |
| 7,335,311 B2 * | 2/2008 | Christophersson | B30B 9/125 | 210/741 |
| 7,344,637 B2 * | 3/2008 | Frommann | B01D 33/11 | 210/159 |
| 7,383,766 B2 * | 6/2008 | McIntosh | B30B 9/065 | 44/550 |
| 7,393,456 B1 * | 7/2008 | Vegesna | B01D 21/245 | 210/535 |
| 7,410,568 B2 * | 8/2008 | Christopherson | B30B 9/163 | 210/111 |
| 7,416,673 B2 * | 8/2008 | Christy | B01D 21/2461 | 423/640 |
| 7,419,049 B2 * | 9/2008 | Henry | B65G 23/20 | 198/860.3 |
| 7,485,223 B2 * | 2/2009 | Eijt | B01D 21/34 | 210/522 |
| 7,514,011 B2 * | 4/2009 | Kulbeth | B01D 21/2461 | 209/172.5 |
| 7,523,570 B2 * | 4/2009 | Pobihushchy | E02F 3/8816 | 37/318 |
| 7,572,370 B2 * | 8/2009 | Branner | B01D 21/2472 | 210/220 |
| 7,662,296 B2 * | 2/2010 | Pancaldi | B01D 29/23 | 210/791 |
| 7,828,961 B2 * | 11/2010 | Sugaya | B01D 33/11 | 210/143 |
| 7,892,424 B2 * | 2/2011 | Mayrand | C02F 3/1242 | 210/523 |
| 8,017,021 B1 * | 9/2011 | Staples | B02C 23/02 | 241/78 |
| 8,033,214 B2 * | 10/2011 | Neubrand | F04B 53/14 | 100/126 |
| 8,048,307 B2 * | 11/2011 | Lee | B01D 67/0088 | 210/781 |
| 8,133,401 B2 * | 3/2012 | Christy | C04B 2/045 | 423/640 |
| 8,147,651 B2 * | 4/2012 | Dykstra | C02F 11/147 | 162/190 |
| 8,163,175 B2 * | 4/2012 | Christy | B01D 21/2461 | 210/167.01 |
| 8,308,953 B2 * | 11/2012 | Lee | B01D 46/0041 | 210/806 |
| 8,337,707 B2 * | 12/2012 | Wold | B01D 21/003 | 210/519 |
| 8,361,313 B2 * | 1/2013 | Pancaldi | B01D 29/111 | 210/167.04 |
| 8,377,301 B2 * | 2/2013 | Miller | B01D 21/2461 | 210/523 |
| 8,393,265 B2 * | 3/2013 | Neubrand | F04B 15/023 | 100/126 |
| 8,440,082 B2 * | 5/2013 | Bahr | B01D 25/285 | 210/396 |
| 9,168,493 B1 * | 10/2015 | Lee | B01D 37/00 | |
| 9,358,484 B2 * | 6/2016 | Tange | B01D 36/045 | |
| 9,561,978 B2 * | 2/2017 | Theodoulou | B30B 9/12 | |
| 9,737,896 B2 * | 8/2017 | Sugawara | B04B 1/20 | |
| 9,776,900 B2 * | 10/2017 | Zou | C02F 11/148 | |
| RE46,632 E * | 12/2017 | Saiz | E21B 21/01 | |
| 10,322,958 B2 * | 6/2019 | Sugawara | C02F 1/008 | |
| 10,343,847 B1 * | 7/2019 | Allard | B65G 33/14 | |
| 10,486,383 B1 * | 11/2019 | Allard | B30B 9/12 | |
| 10,603,675 B2 * | 3/2020 | DeWaard | B01D 33/067 | |
| 10,722,919 B2 * | 7/2020 | Beach | C02F 11/127 | |
| 10,828,583 B2 * | 11/2020 | Takahashi | B01D 29/6476 | |
| 10,857,488 B1 * | 12/2020 | Kulbeth | B01D 21/2472 | |
| 10,967,300 B2 * | 4/2021 | Droke | B01D 19/00 | |
| 10,968,617 B2 * | 4/2021 | Duperon | E03F 5/22 | |
| 10,974,982 B2 * | 4/2021 | Yamashita | C02F 11/147 | |
| 11,167,324 B2 * | 11/2021 | Davis | B08B 9/093 | |
| 11,213,772 B2 * | 1/2022 | Mitchell | B01D 33/705 | |
| 11,219,845 B1 * | 1/2022 | Kulbeth | B01D 33/03 | |
| 11,219,846 B1 * | 1/2022 | Kulbeth | B01D 21/302 | |
| 11,286,188 B2 * | 3/2022 | Syal | B01D 21/34 | |
| 11,319,247 B2 * | 5/2022 | Christy | B01D 21/2444 | |
| 11,358,073 B2 * | 6/2022 | Yun | B01D 21/28 | |
| 11,453,010 B2 * | 9/2022 | Theodoulou | B03B 9/06 | |
| 11,524,253 B2 * | 12/2022 | Moir | B30B 9/121 | |
| 11,754,772 B2 * | 9/2023 | Liu | B29C 48/83 | 362/606 |
| 2002/0043505 A1 * | 4/2002 | Olson | C02F 1/5245 | 210/749 |
| 2004/0237809 A1 * | 12/2004 | McIntosh | B30B 9/047 | 100/145 |
| 2009/0000752 A1 * | 1/2009 | Dykstra | C02F 11/147 | 162/175 |
| 2009/0057235 A1 * | 3/2009 | Sugaya | C02F 11/147 | 210/709 |
| 2010/0108600 A1 * | 5/2010 | Kanda | C02F 11/147 | 210/188 |
| 2010/0213137 A1 * | 8/2010 | Sugaya | B30B 9/125 | 210/709 |
| 2011/0084029 A1 * | 4/2011 | O'Reilly | C02F 11/147 | 210/732 |
| 2011/0089097 A1 * | 4/2011 | O'Reilly | B30B 9/06 | 210/225 |
| 2011/0297016 A1 * | 12/2011 | Yamashita | C02F 11/147 | 100/145 |
| 2011/0303612 A1 | 12/2011 | Al-Jlil | | |

(56) References Cited

U.S. PATENT DOCUMENTS

| | | | |
|---|---|---|---|
| 2013/0036923 A1* | 2/2013 | Faram | B30B 9/121 100/37 |
| 2013/0277319 A1* | 10/2013 | Theodoulou | C02F 1/00 210/770 |
| 2015/0076085 A1* | 3/2015 | Theodoulou | B01D 29/35 210/791 |
| 2015/0197439 A1* | 7/2015 | Zou | D21H 17/01 210/730 |
| 2015/0251940 A1* | 9/2015 | Sugawara | B01D 33/646 210/201 |
| 2016/0096125 A1* | 4/2016 | Wright | B01D 29/96 210/359 |
| 2017/0050400 A1* | 2/2017 | Sugawara | B04B 1/20 |
| 2018/0200759 A1* | 7/2018 | Beach | B07B 13/16 |
| 2019/0111440 A1* | 4/2019 | Theodoulou | B03B 9/06 |
| 2020/0368649 A1* | 11/2020 | Moir | B30B 9/121 |
| 2021/0236965 A1* | 8/2021 | Riedel | B01D 29/661 |
| 2021/0394088 A1* | 12/2021 | Yun | C02F 1/24 |
| 2022/0219101 A1* | 7/2022 | Sabol | B01D 29/94 |
| 2022/0362821 A1* | 11/2022 | Chiodini | C12M 45/04 |

FOREIGN PATENT DOCUMENTS

| | | | | |
|---|---|---|---|---|
| KR | 2008 0092612 A | 10/2008 | | |
| SE | 457637 B | 1/1989 | | |
| WO | WO-2019067658 A1 * | 4/2019 | | B01D 29/356 |

OTHER PUBLICATIONS

Hydria Water, Channel Filter TS, 4 pp, undated. (Year: 2023).*
Hydria Water, Sludge Receiver EX, 4 pp, undated. (Year: 2023).*
Hydria Water, Washpress Gamma WPG, 4 pp, undated. (Year: 2023).*
Hydria Water, Wash Press TP, 4 pp, undated. (Year: 2023).*
Hydria Water, Ram Press RP, 4 pp, undated. (Year: 2023).*
International-Type Search Report for corresponding Swedish application SE2050106-0, dated Sep. 1, 2020.

* cited by examiner

SEPARATION DEVICE AND METHOD TO SEPARATE CONTAMINANTS FROM CONTAMINATED WATER

TECHNICAL FIELD

The present disclosure relates to a separation device to separate contaminants from contaminated water. It comprises a container to receive the contaminated water. The container further comprises a contaminated water inlet, a filter, a presser for compressing and/or dewatering contaminants separated from the contaminated water, and a contaminant outlet. The present disclosure relates to a use of such a separation device and a method of separating contaminants from contaminated water.

BACKGROUND

Press screws and hydraulic piston presses are conventional separators to separate contaminants from water in for instance waste water filtration or sludge dewatering processes. Their basic function is to receive contaminated water in a container and use their screw or piston to press the contaminated water towards the contaminant outlet, thereby pressing the water through a filter and continuously dewatering the mass of remaining contaminants as it moves towards the contaminant outlet to be rejected.

Operators of waste water plants want to reduce the cost and increase capacity. There are many problems with trying to increase the capacity in a separator as described above. For example, as the water is pressed through the filter, some particles get stuck. This is at least partially mitigated by having brushes on the sides or edges of the press so that it brushes the filter while in operation. The filter still clogs since the brushes do not reach everywhere and wear with time, so the operations must be paused for maintenance to clean the filters and replace the brushes, affecting productivity negatively.

Contaminants have different characteristics. Using sedimentation as a separation technique, an important characteristic is if it with time floats or sinks in water. A factor to speed up the process would be to get the sedimentation done quicker so that the particles can be ejected faster from the separation device so that the subsequently less contaminated water can be processed further.

Conventional separators therefore use impellers or agitators to break down contaminants. These are moving components that also wear and get debris entangled to them, thus have a tendency to malfunction, causing unnecessary stops in production for maintenance.

SUMMARY

An object of the present disclosure is therefore to, at least to some extent, overcome the problems with the prior art as listed above, or to provide a useful alternative.

The above object is achieved by the separation device according to claim 1.

As such the present disclosure according to a first aspect relates to separating contaminants from contaminated water by means of a separation device. The separation device according to the present disclosure may be one in a line of several steps for the process of cleaning water into a desired quality. The separation device comprises a container to receive the contaminated water to be processed. The container has a contaminated water inlet to receive the contaminated water, a filter to filter contaminants from the contaminated water, a presser for compressing and/or dewatering contaminants separated from the contaminated water, and a contaminant outlet to eject contaminants. The container further comprises a gas inlet for generating gas bubbles into the contaminated water to further separate contaminants from the contaminated water. The gas inlet is arranged to supply gas substantially through the filter, preferably completely through the filter. The filter is used to block contaminants from leaving the separation device when emptying it after a batch run of separation and/or dewatering. However, in the known separation devices the filter may become clogged and emptying may take unnecessarily long time. An advantage of generating gas through the filter is that it automatically cleans and de-clogs the contaminants otherwise getting stuck in the filter holes, causing the filter to lose its filtering function over time. This reduced the need of costly downtime to clean or substitute the filter. When the gas passes through the filter into the contaminated water, the filter also strengthens the generation of gas bubbles which further improves the separation process.

Optionally, the contaminant outlet is located adjacent to the filter, and the presser is arranged to sweep off contaminants from the filter and compress them into the adjacent contaminant outlet.

The benefit of generating gas bubbles into the contaminated water is that the separation process is enhanced and expedited. The contaminants to be ejected through the contaminant outlet lose buoyancy and sink quicker to the bottom of the container to be subsequently compressed and/or dewatered and thereafter ejected for potentially further processing elsewhere. Moreover, the generation of bubbles may cause the contaminated water to stir and even to circulate. Such stirring and circulation generates more contaminants to be drawn into the section with gas bubbles where they are more efficiently separated, further enhancing the whole process. Another effect of the introduction of gas bubbles into the contaminated water is that lightweight contaminants that have been separated from the contaminated water may follow the gas bubbles upwardly towards the surface of the slurry of contaminants and water. Such lightweight contaminants would possibly anyway have surfaced after some time also without any addition of gas bubbles, but this process may hereby be expedited.

Optionally, the gas inlet is located on an opposite side of the filter compared to the separated contaminants to be compressed and/or dewatered. In this position the gas inlet is protected from the slurry in the separation device which otherwise may damage or even clog the gas inlet.

Optionally, the separation device comprises a water outlet. The separation device may have many filters to separate water, or have one filter extending over a relatively seen large area. By providing a water outlet the water separated along the filter or filters may be lead to a specific point, thereby controlling where the water is ejected.

Optionally, the water outlet is a valve. By the use of a valve, the timing of when the water is ejected can be controlled. This may be beneficial in the overall water cleaning process to control and communicate to the machinery in a subsequent cleaning step when a batch of water is expected. Moreover, when supplying gas through the gas inlet it is good to keep the valve of the water outlet closed, enabling more gas to go through the filter and not slip out through the water outlet hole. This is especially beneficial in the end of the process when the slurry of contaminants and water gets thicker and more condensed with contaminants, potentially making it harder to generate the bubbles.

Optionally, the separation device further comprises a compartment between the water outlet valve and the filter. The compartment except for a portion in the vicinity of the filter may consequently be substantially gas tight when the valve is closed. An advantage of a substantially gas tight compartment is that there is no loss of gas generated. The gas inlet does not necessarily need to be directed into the contaminated water through the filter with high pressure nozzles as an example, but even for the gas that misses entry into the container initially, will build up pressure inside the gas tight compartment and bubble up into the contaminated water eventually anyhow, reducing the consumption of compressed gas and increase the efficiency of the separation device.

Optionally, the gas inlet is arranged to supply gas into the compartment. This way the gas inlet may be mounted wherever it is most convenient, based on for instance an access point to compressed gas in the area surrounding the separation device. Further, as the gas inlet's function may now be to build pressure inside the gas tight compartment, the gas inlet may also be separated from the immediate proximity of the filter. As it doesn't need to be placed where the water is supposed to come through, it reduces the need of servicing the gas inlet's valves or nozzles. Also, as the gas inlet may be moved away from the filter, it makes the filter more accessible for service and maintenance.

Optionally, the gas supplied by the gas inlet is ambient air. Although other gases could be delivered in tubes and used to fine tune the process for different contexts, such as different types of contaminants, the use of ambient air is usually sufficient and a cheap option. In water cleaning processes ambient air is mostly readily available anyway for other purposes.

Optionally, the gas is compressed ambient air, preferably compressed to a pressure in the range of 1-15 Bar, more preferably 1-13 Bar, and most preferably 1-12 Bar. A benefit of having compressed air, and especially in this range of compression, is that the gas bubble generation can be ensured throughout the whole process. Further the generation of gas bubbles may be sufficiently "explosive" so that the gas does not only find its way through clean filer openings, but also pushes its way out through the clogged filter openings having contaminants stuck in them. This way the gas may de-clog the filter openings by removing its contaminants, ensuring the filter's capacity to filter water and reducing the need to shut down operations for maintenance of the filter. By "explosive" is meant suddenly going from low pressure to high pressure in the compartment. By "clogged" filter opening is meant both completely clogged, i.e. that water is not going through, or only partially clogged openings where water is still coming through but to reduced filtering capability. 1-12 Bar is considered most preferable as it is usually enough to deliver the effect as described above and keep the required machinery affordable. The air may i.e. be supplied using an otherwise known air compressor, and does not need to be delivered in tubes, thus saving cost. Usually plants and factories already have a central system for compressed air to connect to, so that each individual separation device does not need an individual air compressor. Optionally, each separation device may have an air compressor as back-up to compress ambient air and generate bubbles even if a central air supply would malfunction.

Optionally, the filter has an extension along an axial extension of the presser. This way it may expose its filtering surface along the direction in which the contaminated water is moving, enabling high filtration of water. Moreover the filter may preferably be put along the bottom of the container when the presser goes sideways, enabling gravity to assist pushing water through the filter. By sideways is meant in a direction substantially perpendicular to gravity. If the filter is placed along the axial extension of the presser and in close proximity to it, the presser may move away contaminants from the filter while in operation, thereby keeping the filter clean. The filter may be flat, but it may also have any other form, such as a semi-circular stretching around the presser. It may also have any shape in between flat at the bottom of the presser and semi-circular around the presser. Optionally the main part of the container may be made as filter with filter openings enabling filtration of water along all sides.

Optionally, the filter has an extension along the axial extension of the presser of at least 5 cm, more preferably of at least half of the axial extension of the presser within the container, most preferably of a full length of the axial extension of the presser within the container. It has been found that the filter needs to be at least 5 cm wide in order to have an effect on the contaminant separation efficiency. Preferably it should have an extension of at least 10 cm to enable and to promote at least some circulation of the contaminated water. The circulation moves more contaminated water into the part of the container where gas bubbles rise to the surface above the filter to be treated, increasing the separation efficiency. Also, the circulation affects where lighter contaminants gather at the surface, making it easier to handle the removal of those in a potential later step. A way to achieve a separation effect by way of the circulating is to have the filter along substantially half of the available width along the axial extension of the presser as a filter. This embodiment can be particularly suitable in a context known to have a lot of lighter contaminants gathering at the surface. To achieve an even better separation effect the filter extends along the full width of the axial extension of the presser. This way most of the container becomes a space to separate contaminants, enabling contaminants to sink down to the bottom or follow the bubbles up to the surface along the full width of the axial extension of the presser inside the container. This can be particularly beneficial in a context with a lot of heavy contaminants that should sink to the bottom and be ejected through the contaminant outlet. When referring to the width of the filter it is here meant the width taken up by filters that have a gas inlet function. The filter may very well constitute several separate filters with individual gas supplies, which can be particularly good when the gas supplied is not powerful enough to support the full width of a filter etc. Also, it may be a good option if gas supply is unreliable, making sure at least some bubbling effect even if one gas supply fails.

Optionally, the filter is arranged closer to the contaminant outlet in relation to the presser than to an opposite end of the presser, more preferably adjacent the contaminant outlet. This is an effective way to achieve separation as the heavy contaminants sink close to the contaminant outlet, ready to be ejected. Also, as explained above in the preceding paragraph, to have bubbles generated at a side of the container a circulating effect is generated, subsequently controlling also where the separated light contaminants ends up on the surface of the container, enabling their more effective removal.

Optionally, the filter has a plurality of filter openings of a size in the range of 0.1-15 mm, preferably of 0.1-10 mm, more preferable of 0.1-5 mm. The filter openings control not only the amount water and what contaminants are admissible to pass through, but also the size of the gas bubbles generated into the contaminated water. The desirable gas bubble size varies for example based on the mix of contaminants and for instance the purpose of the current step in the overall water treatment or cleaning process. In general, finer, i.e. normally smaller, gas bubbles generate a higher separating effect, especially to separate contaminants of different characteristics from each other, for instance heavy contaminants with lighter contaminants. In the context of treating waste water, water needs to pass through the filter openings efficiently, in order to maintain a high output, rendering almost no need to go below 0.1 mm in openings size. The benefit of having bubbles in the size of up to 15 mm is having a high water throughput, especially when treating contaminated water early in the process with relatively seen very large contaminants. This situation is not very common, so a 10 mm opening size is usually sufficient in most cases to enable high water throughput although not letting through to big contaminants. Overall the most useful interval to use for filter openings has so far been found to be between 0.1-5 mm. 0.1 mm as it is not too small making it difficult and expensive to manufacture, yet small enough to produce very fine gas bubbles and allowing water to pass with only very fine contaminants remaining. 5 mm is in turn good as it is a good trade-off between separation productivity and filtering of contaminants. In other words, the 5 mm openings generate gas bubbles with a high separation efficiency, especially for allowing larger contaminants to quickly sink to the bottom, as well as ensuring high water throughput, while also filtering away much of the contaminants. The shape of the openings in the filter may be rounded, like elliptical or circular, or angular, such as triangular, rectangular or square. Other shapes may be found preferable as well.

Optionally, a diameter of generated gas bubbles has a range of 0.1-15 mm, preferably of 0.1-10 mm, most preferable of 0.1-5 mm. This enables the separation desired of the contaminants from the contaminated water. The size of the gas bubbles is generally determined by the filter openings. The value of having different gas bubble size is explained in the previous paragraph. The desirable gas bubble size varies based on for instance the mix of contaminants and the purpose of the current step in the overall water treatment process. In general, finer gas bubbles generates finer separating effect, at least in terms of separating contaminants of different characteristics from each other. Contaminants with different characteristics may for instance be heavy contaminants prone to sink versus lighter contaminants prone to float. These are good to separate in order to facilitate the sedimentation of the contaminants, thus speed up the overall separation process. Also, contaminants of different characteristics may due to this reason have different means more suitable to further remove them from the water and/or dispose of them, demonstrating another benefit of the finer bubbles' effect to separate contaminants from each other to greater detail. Larger gas bubbles lack the same separating effect, but is more efficient earlier in the process to allow larger contaminants to be separated by sinking to the bottom or follow the bubbles to the surface. The effect of using smaller bubbles than 0.1 mm is most often not worthwhile, at least not on the context of separating waste water efficiently. There is rarely any need to have larger bubbles than 15 mm, as bigger gas bubbles does not have significant effect on allowing larger contaminants to sink. Further, there is rarely any need for having greater separation effect on larger contaminants in waste water treatment than already provided by the bubbles being 15 mm. The benefit of having 10 mm is that it has high separating efficiency to large contaminants while the correlating filter opening enables high water throughput although some additional filtering of contaminants. The benefit of having up to 5 mm bubbles is that they provide enough separation efficiency of large contaminants for most purposes in general, while the correlated filter openings provide a good trade-off between water throughput and contaminant filtering.

Optionally, a second contaminant outlet may be provided for removal of substantially floating contaminants from the container. The main benefit of having a second contaminant outlet is firstly to generate higher contaminant separation capability. Moreover, the second contaminant outlet can be adapted to eject another type or fraction of contaminants to enable a more efficient separation of contaminants with different characteristics than the contaminants intended for the first contaminant outlet.

Optionally, the second contaminant outlet is located in a vertically seen upper region of the container. Floating contaminants may hereby be removed in a simple fashion and processed further elsewhere if desired. Floating contaminants may also have other characteristics than contaminants to be removed through the presser, whereby keeping the different kinds of contaminants apart may be desired in itself.

Optionally, the separation device may comprise a grease trap. Grease is a particular fraction which may be desired to handle on its own since such fractions may be detrimental to parts of the separation device or to the separation process as a whole.

Optionally, the separation device may comprise an impeller for stirring the contaminated water in order to support the separation of contaminants with different characteristics from each other, preferably located vertically seen above the presser. Such an impeller may be beneficial for further separation of contaminants, if and when the gas bubbles introduced into the separation device are not enough to achieve a desired level of separation.

Optionally, the presser is arranged to compress the contaminants towards the contaminant outlet.

Optionally, the presser is a screwing device. Such a presser is simple and efficient and consequently an inexpensive alternative.

Optionally, the presser is a linear compression device, such as a hydraulic cylinder. Such a presser may be beneficial for example when a high pressure is desired for compression and/or dewatering of separated contaminants.

Optionally, the separation device may comprise a second water inlet for introducing additional water into the container. Such additional water may be desired to gain a slurry which is adequate for the process of separation of any contaminants from the contaminated water. The additional water is consequently water which generally is not contaminated in the way the contaminated water is.

Optionally, the separation device may comprise a level gauge for smoothly running the separation, compression and/or dewatering process.

Optionally, the separation device may comprise a sensing device for measuring characteristics of the contaminated water inside the container.

Optionally, the sensing device may be connected to the second water inlet, for automatically adapting any water supply through the second water inlet based on pre-set parameters.

Optionally, at least one second filter, the at least one second filter being of different kind to the filter. Preferably the second filter is a passive filter. A passive filter may be one which has no moving parts such that wear and any servicing is at a minimum.

Optionally, the at least one second filter has an extension along the axial extension of the presser, preferably along substantially a full remaining length of the axial extension of the presser not covered by the filter.

Optionally, the separation device may comprise an extended compacting arrangement extending from the contaminant outlet. The extended compacting arrangement may come in addition to the presser or as an integrated part with the already existing presser. Certain contaminants may require additional compacting in order to be thoroughly compacted and/or dewatered.

Optionally, the presser also extends through the extended compacting arrangement.

Optionally, the extended compacting arrangement has a third filter extending along the axial extension of the presser, preferably located at the axial end of the presser's reach.

Optionally, the third filter is connected to the compartment.

Optionally, the presser comprises brushing elements in abutting contact with at least one of the filters, preferably to the second filter, more preferable to the first and the second filter, most preferable in abutting contact all filters. Such brushing elements may be assisting in de-clogging the filter in order for emptying the separation device adequately fluently.

According to a second aspect of the present disclosure the use of a separation device of a kind as described above for separating contaminants from contaminated water is presented.

According to a third aspect of the present disclosure a method of separating contaminants from contaminated water is presented. The method comprises the steps of adding contaminated water into a container; generating gas bubbles in the contaminated water by supplying gas substantially through a filter, preferably completely through the filter; and compressing and/or dewatering contaminants separated from the contaminated water. The benefit of generating gas bubbles into the contaminated water by supplying gas substantially through a filter, preferably completely through the filter is that the separation process is enhanced and expedited while automatically cleaning and de-clogging the contaminants otherwise getting stuck in the filter holes, causing the filter to lose its filtering function over time. The separation process is enhanced and expedited as the generated gas bubbles causes contaminants to lose buoyancy and sink quicker to the bottom of the container to be subsequently compressed and/or dewatered, and thereafter ejected for potentially further processing elsewhere. Moreover, the generation of bubbles may cause the contaminated water to stir and even to circulate. Such stirring and circulation may generate more contaminants to be drawn into the section of the contaminated water with gas bubbles where they are more efficiently separated, further enhancing the whole process. Another effect of the introduction of gas bubbles into the contaminated water is that lightweight contaminants that have been separated from the contaminated water may follow the gas bubbles upwardly towards the surface of the slurry of contaminants and water. Such lightweight contaminants would possibly anyway have surfaced after some time also without any addition of gas bubbles, but this process may hereby be expedited.

Optionally, the method may further comprise a step b.1):
b.1) activating an impeller to break down and separate contaminants of different characteristics from the contaminated water. The step b.1) may assist the separation process of the method in general.

Optionally, the method may comprise a step b.2):
b.2) ejecting contaminants gathered floating on a surface of the contaminated water.

Optionally, the steps b) and b.1) may be made simultaneously in order to be most efficient.

Optionally, step b) and b.1) and c) are made simultaneously.

Optionally, the method may comprise pressing the separated water through a filter and pressing separated contaminants through a contaminant outlet.

BRIEF DESCRIPTION OF THE DRAWINGS

With reference to the appended drawings, below follows a more detailed description of embodiments of the disclosure cited as examples.

In the drawings.

DETAILED DESCRIPTION

Below follows a detailed description of the disclosure with reference to the appended drawings.

Figure 1:
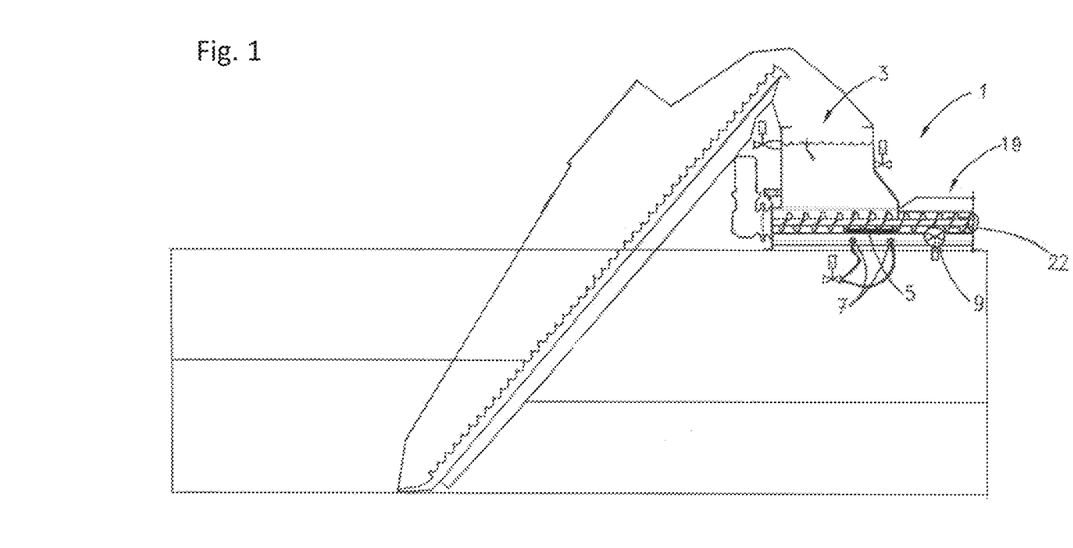
FIG. 1 is a schematic perspective view of a separation device according to the present disclosure in context with related machinery.

FIG. 1 discloses an example of a separation device 1 according to the present disclosure, implemented in an environment it could typically be used. The separation device 1 may be used anywhere where there is a need to separate contaminants from water, typically such applications could include, but not be limited to, waste water filtration, screenings dewatering or sludge dewatering.

By contaminants is meant anything that is not intended for the intended end use of the water. It should not be mistaken to refer to only poisonous substances, or other matter that is otherwise largely unwanted after the filtration is done. In fact, some of the contaminants may be desirable, for instance the biological contaminants may be used to fertilize fields and crops, or to generate bio-gas, to give only a few examples. The contaminants can come in many shapes and forms. They can be larger particles, finer sediments, salts or crystals, grease, oil or liquid.

FIG. 1 shows the separation device 1 in a typical but non-limiting waste water filtration system set-up. Other waste water filtration systems may be implemented in combination with the present separation device 1. In the set-up of FIG. 1, the contaminated waste water flows in a first step towards a first screening device, typically called a screen, which is adapted to remove solid contaminants from the waste water flow. An example of solid contaminants in typical household waste may be fecal matter, toilet paper and mineral solids, such as salt. In the figure it may be gleaned that the water flows from left to right, as the water level is higher on the left hand side of the screening device, showing water flowing towards and pushing against the screening device trying to pass through.

The screening device transports a wet mix of the filtered solid contaminants up from the waste water and drops it into a container 2 of the separation device 1 via a contaminated water inlet 3. The thickness or characteristics of the mix of wet solid particles may vary greatly, everything from mostly water to mostly wet contaminants. Although thicker mixes are arguably more suitably described as wet contaminants, the term "contaminated water" will be used in the examples below no matter the characteristics of the received material to be separated by the separation device 1.

Figure 4:
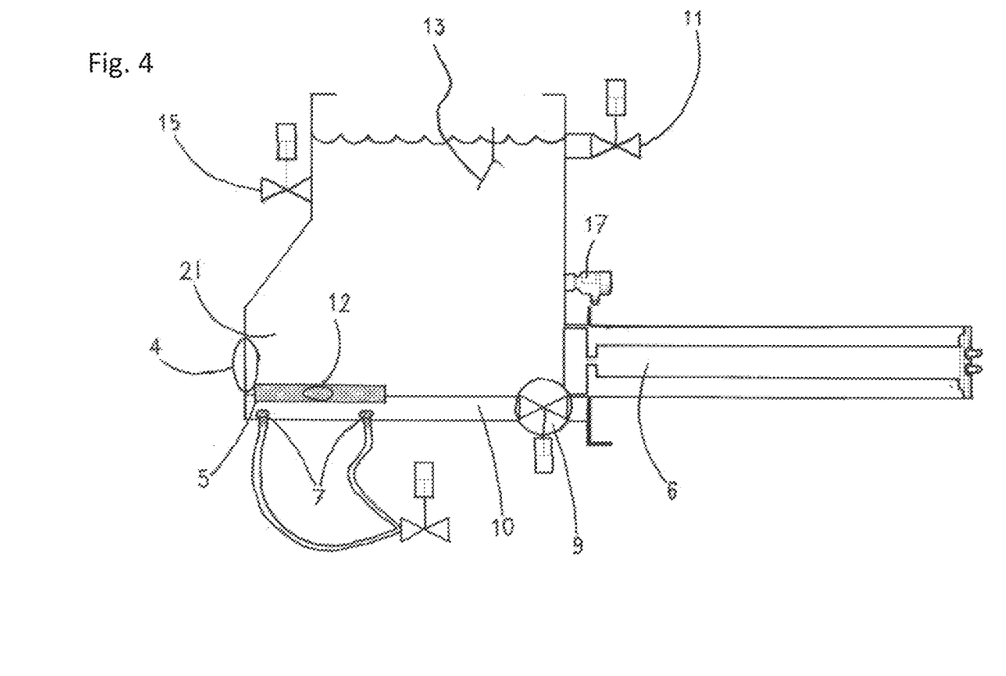
FIG. 4 is a cross sectional view of an alternative embodiment of a separation device according to the present disclosure.

When the contaminated water is received inside the container 2, the process to separate the contaminants from water according to the present disclosure begins. FIG. 1 shows the principles of a separation device 1 according to the present disclosure to support this process. In the bottom of the container 2 there is a presser 6 that is adapted to compress and/or dewater contaminants that have been separated from the contaminated water towards a contaminant outlet 4 located preferably somewhere along the presser 6 and typically as in the figure at the axial end of its reach. Here the presser 6 is a screw device, but it can also be any other type of device adapted to compress and/or dewater contaminants, driven by any suitable means. Alternatively the presser 6 may be a linear compression device as shown in FIG. 4, such as a cylinder press, like a hydraulic press. Here the presser 6 is driven by an electrical engine, but the presser 6 may be driven by any other suitable means. The presser 6 may be driven by hydraulic or pneumatic means.

Shown is also a filter 5. One of the filter's 5 functions is to allow water to pass through, while contaminants are filtered out from the passing contaminated water and maintained in the container 2. The separated contaminants are then to be ejected in a separate contaminant outlet 4, thereby accomplishing the separation process. Here, the filter 5 is suitably located in close connection to the presser 6 and the contaminant outlet 4 of the container 2, leading into an optional extended compacting arrangement 19. The position of the filter 5 enables the presser 6 to sweep off contaminants from the filter 5 and compressing them into the contaminant outlet 4 located adjacent to the filter 5. This way, the filter 5 is kept at least to some extent clean, enabling water to pass through. Also, the contaminants are efficiently ejected through the adjacent contaminant outlet 4, avoiding the risk of stirring up the contaminants again, as may be the case when contaminants are transported longer distance to be ejected.

This is just an example of a placement of the filter 5, but it can have many different placements, shapes and sizes according to the disclosure. It may, by non-limiting examples, be placed anywhere else in the container 2 or extend along a full length of the container 2 or presser 6. It may be flat, semi-circular or any other shape. The separation device 1 may comprise several filters 5.

FIG. 1 further discloses gas inlets 7 to generate gas bubbles 8 into the contaminated water. As separation of contaminants is at least partly made by sedimentation, i.e. by contaminants sinking down or floating up, the sedimentation process, thus the separation process overall, is sped up by the generation of gas bubbles 8 into the mix. The contaminants prone to sink over time lose buoyancy and sink faster to the bottom to be ejected, whereas some contaminants prone to float over time follow the bubbles 8 upwardly towards the surface. FIG. 1 indicates a second contaminant outlet 11 (best seen in see FIG. 2) placed in relation to the surface of the contaminated water for ejecting floating contaminants which are gathered there.

The gas 8 supplied may be compressed gas 8. The compressed gas 8 may be compressed air, typically made from compressed ambient air. The compressed air may preferably be compressed to a pressure in the range of 1-15 Bar, but normally 1-13 or even 1-12 Bar is most suitable.

The gas inlets 7 are arranged to supply gas 8, typically compressed air, through the filter's 5 filter openings 12. As such the gas inlets 7 may be high pressure air nozzles. The air nozzles may be attached to the filter 5, or arranged to eject high pressure air jets from a distance. The gas inlets 7 may also be of any other type. FIG. 1 further discloses a water outlet 9 through which water which has passed through the filter 5 is ejected. The filtered water may simply be ejected down into the general flow of waste water again to proceed to any following waste water treatment step. The filtered water may also be lead into a specific treatment step directly.

Figure 2:
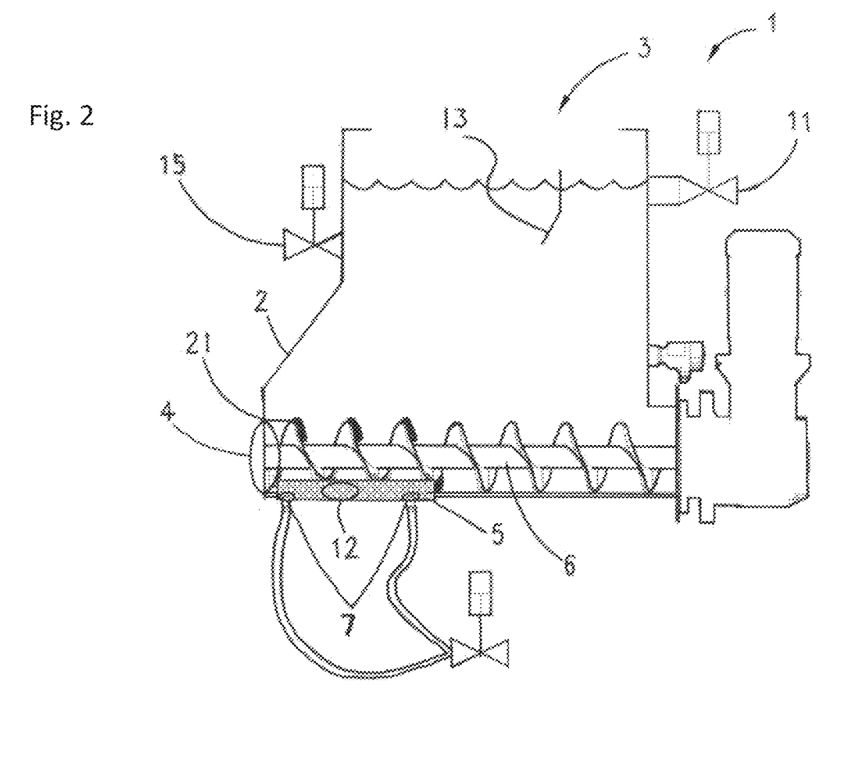
FIG. 2 is a cross sectional view of the separation device in FIG. 1.

FIG. 2 discloses a cross-sectional view of the separation device 1 according the disclosure, the basic principles, components and functions of which largely explained in FIG. 1 already. As may be gleaned from the figure, the separation device 1 has gas inlets 7 directed towards the filter 5 intended to generate gas bubbles 8 into the contaminated water. The gas inlets 7 may be mounted directly or indirectly to the filter 5, or just be arranged in close connection to it. The second function of the filter 5, and in particular of the filter openings 12 through the filter 5, is to provide the gas 8 in a form which assists the separation process of the contaminated water. The filter openings 12 ascertain that gas bubbles 8 are formed which have an adequate size for the separation to take place. Bubbles 8 of different sizes have different characteristics in its separating effect. Finer bubbles 8 are more effective to separate contaminants of different characteristics from each other, bringing floating contaminants quicker towards the surface of the contaminated water. Bigger bubbles may be better to effectively bring down larger sinking contaminants. The bubble size is determined by the filter openings 12, making choice of filter 5 different depending on what contaminants to expect. Simultaneously, the gas 8 is assisting also in maintaining the filter openings 12 open by de-clogging them, such that water later may be floating in an opposite direction to the gas direction, for later ejection.

The presser 6 presents brushing elements 21 at its outer circumference along the part that is extending over and along the filter 5. The brushing elements 21 assist in cleaning the filter 5 while the presser 6 is in operation, preventing the filter 5 from clogging.

FIG. 2 discloses the second contaminant outlet 11 for ejecting contaminants gathered at the surface, mentioned already in FIG. 1. The contaminants gathered here may be of largely the same or of different characteristics than the contaminants that are sinking and supposed to be compressed. The contaminants here may be faecal matter or grease that attaches itself to water to a larger extent making it harder to dewater, thus undesirable to separate mechanically through this mechanical step. The contaminants ejected through this second contaminant outlet 11 may largely be mixed in with water. The water with contaminants ejected through the second contaminant outlet 11 may be more suitably directed directly to a specific processing step given it is already concentrated with contaminants, rather than being mixed with the overall waste water flow again.

FIG. 2 further discloses an optional grease trap 13. A purpose of the grease trap 13 is to separate grease from the contaminated water. Another purpose is to gather grease and other contaminants floating to the surface around the second contaminant outlet 11. The grease trap 13 may be of otherwise known type and is not further disclosed here.

FIG. 2 further discloses an optional second water inlet 15. This second water inlet is arranged to supply more water to the contaminated water to enhance the separation effect of the gas bubbles 8 if the mix of contaminants and water is too thick for optimal effect.

Figure 3:
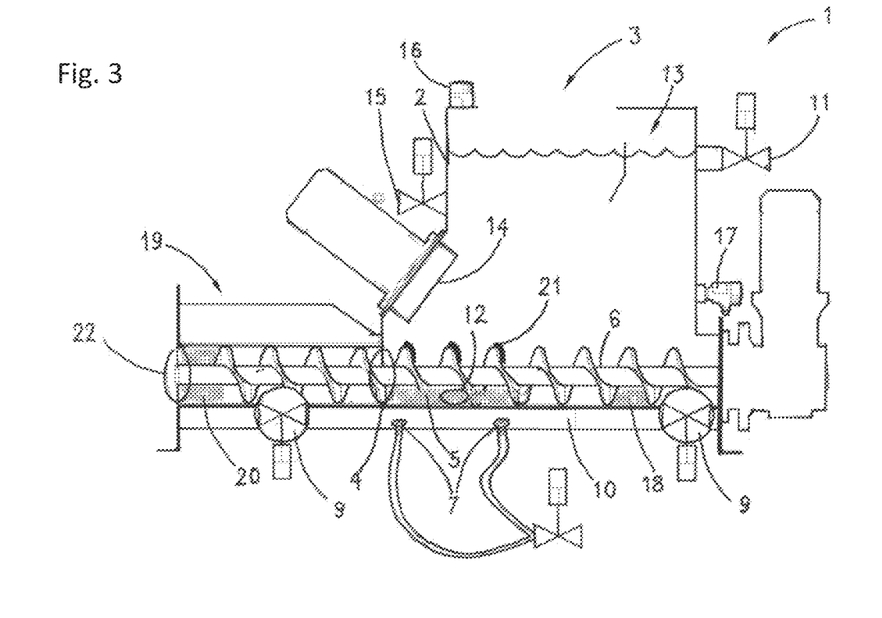
FIG. 3 is a cross sectional view of an alternative embodiment of a separation device according to the present disclosure.

Turning to FIG. 3, it discloses in cross sectional view a separation device 1 according the disclosure, in many aspects similar to FIG. 2, yet including further optional features.

Firstly, FIG. 3 discloses a compartment 10, which in this non-limiting example is located underneath the filter 5 and extending along the axial extension of the presser 6. FIG. 3 further discloses a water outlet 9 as in i.a. FIG. 1. The compartment 10 is a space that connects the filter 5 and the water outlet 9. One purpose of having a compartment 10 is to gather the filtered water from the filter 5 and eject it from a specific location in an orderly manner compared to just dripping down continuously. This can be particularly advantageous if the water is to be directed to a specific step after being separated from the main waste water flow. In a further embodiment of the compartment 10 the water outlet 9 is a valve. This way also the timing of when the water is ejected may be controlled, making it easier to control the overall water cleaning process in relation to other machinery. For instance, the water may be gathered in the compartment 10 and not ejected until a full batch of contaminated water has been fully processed, or not until a receiving device is ready, etc. In a further embodiment of the compartment 10, the gas inlets 7 are directed towards the filter 5 by being mounted to the compartment 10, as can be seen in FIG. 3. In FIG. 2 the gas inlets 7 are mounted to the filter 5, or otherwise arranged close to the filter 5. Returning to the example in FIG. 3, the full area of the filter 5 can be utilized for filtering water, not holding gas inlets 7. Also, by mounting the gas inlets 7 with some distance to the filter 5, a larger area of the filter 5 may be affected by the pressurized gas jets ejecting from the gas inlet, keeping a larger quantity of filter openings 12 from clogging. Further, mounting gas inlets 7 with some distance make the filter 5 more accessible for maintenance. Further on that aspect, the lower part of the compartment 10 may for instance be hinged to the separation device 1 and thereby being possible to open, or at least have a hatch in the area of the filter 5 to open when attending to the filters 5. This way the gas inlets 7 are moved away automatically from the filter area when opening the compartment 10 or the hatch. The gas inlets 7 are schematically visualized as two hoses connected to gas supply, but this may be arranged in many different manners. The gas inlets 7 may be different in shape, number or form to supply gas. The gas inlets 7 may comprise one or several air nozzles connected to compressed air via hoses or pipes. The gas inlets 7 may comprise a container like body to receive pressurized gas 8, the container having holes to generate bubbles 8 or air jets to subsequently generate bubbles 8 in the contaminated water, to give only a few non-limiting examples.

In another optional feature, the compartment 10, except for the filter 5, is made substantially gas tight when the water outlet valve 9 is closed. As such, gas 8 may be supplied in the gas tight compartment 10 and bubble up into the contaminated water, no matter where the gas inlets 7 are directed. As there is no loss of gas 8 through the gas tight compartment 10, all supplied gas 8 enters into the contaminated water, thus the consumption of compressed gas 8 is reduced and the efficiency of the separation device 1 is increased.

Further, this enables the gas inlets 7 to be mounted anywhere along the compartment 10 as the gas inlets 7 does not necessarily need to be arranged in close vicinity to the filter 5. This way the gas inlets 7 may be mounted anywhere wherever it is most convenient, based on for instance an access point to compressed gas 8. Further, as the gas inlet 7 may be moved away from the filter 5, it makes the filter 5 more accessible for service and maintenance. Also, as the gas inlets 7 can be less exposed to water and contaminants from the filter 5 area, it reduces the need of servicing the gas inlets' 7 valves or nozzles. Also, cleaning of the filter openings 12 may still be achieved even to a better extent as the gas 8 supplied is inevitably passing through the filter 5, compared to maybe only small portions of the filter 5 directly affected by the jet streams of compressed gas 8 was cleaned before. To avoid gas 8 only going through filter openings 12 already free from contaminants, failing to clean clogged ones, gas 8 can sometimes be supplied in an explosive manner. By explosive manner is meant suddenly going from low to high pressure. This way the gas 8 expands suddenly inside the compartment 10, pushing the clogging contaminants out from the filter openings 12 making them available for bubble generation and water filtration once again.

FIG. 3 further discloses an optional compacting arrangement 19. The compacting arrangement 19 extends axially from the contaminant outlet 4 to receive its ejected contaminants. The compacting arrangement 19 the conducts a final compressing and dewatering step to dewater the contaminants as much as possible before ejecting them through the third contaminant outlet 22. This is done by exposing the contaminants to high compacting pressure around the area for the third filter 20, as the third contaminant outlet 22 is adapted to press against the contaminants compressed by the presser 6 before ejecting the contaminants. The contaminants may be of biological, which as previously mentioned may be used for fertilizing fields and crops or used for bio-gas only to mention a few examples. As such, the contaminants may be ejected for transportation elsewhere, thus it is important to compress and dewater the contaminants as much as possible to reduce space and weight.

The compartment 10 can be seen stretching along the full extension of the compacting arrangement 19. This way water received through the third filter 20 will be led to and ejected from the same water outlet valve 9 as the water coming from the filter 5. When gas 8 is supplied to the compartment 10 being gas tight and arranged like this, most gas 8 will still be ejected through the filter 5 anyhow due to the density of the contaminants pressing against the filter there. The compartment can be arranged not stretch all the way to the third filter 20 too, leaving the compartment 10 gas tight. This arrangement is disclosed at the other axial end of the presser 6, where the compartment 10 clearly ends before the second filter 18, leaving the second filter 18 with a separate space and water outlet valve 9.

By second filter 18 is meant another type compared to the filter 5, typically a traditional filter without connection to gas inlets 7. The second filter 18 in FIG. 3 could also be replaced with another filter 5 supplying gas 8, which could have a separate compartment 10 with individual gas inlets 7, or be connected to the other filter 5.

FIG. 3 further discloses an optional impeller 14. The optional impeller 14 may further support the separation of contaminants by stirring the contaminated water with relatively seen high force, thereby breaking down larger contaminants and causing contaminants of different characteristics to separate from each other. Typical contaminants to separate are for instance adhesive contaminants, like faeces and grease that binds water to a larger extent, from other contaminants. To have them separated results in higher degree of compacted and dewatered contaminants ejected in the end.

The impeller 14 is seen propelled by a powerful electrical engine. The impeller 14 gets entangled with debris over time, like textiles and hair etc. that creates imbalance resulting in noise, wear and eventually failure of the impeller 14 function and the expensive electrical engine that propels it. This can happen very suddenly and there is no telling weather it gets entangled and breaks down within a specific time frame after its installed or serviced like any other normal wearing component, leaving a high degree of uncertainty to the operations. As the generation of bubbles 8 has roughly the same effect as using an impeller 14, yet without the moving expensive components and machinery, thus making it both cheaper to operate and more reliable, the impeller 14 may preferable be used only at times of particularly challenging contaminants or situations.

The impeller 14 may also alternatively be an agitator.

FIG. 3 further discloses an optional level gauge 16, here arranged at the top of the container 2. The purpose of the level gauge is to monitor the surface level of the contaminated water to support preventing the separation device 1 from over flowing, causing unfiltered contaminated to back into the waste water in the case of a typical set-up as displayed in FIG. 1. The level gauge 16 can use any sensing means for indicating surface level and/or warn at a certain point, such as mechanical means, visual means, radar to give only a few non-limiting examples. The level gauge 16 may also be placed differently based on the sensing means used. The level gauge 16 may not even be attached to the container 2, but be a separated part.

FIG. 3 further discloses an optional sensing device 17. The sensing device 17 may measure the characteristic of the contaminated water. One of the characteristics may be the viscosity of the contaminated water. The sensing device 17 may be connected to the second water inlet 15 to automatically supply additional water to the batch of contaminated water to obtain a viscosity more adequate for separating the contaminants.

FIG. 4 discloses a cross-sectional view of the separation device 1 according the disclosure, much like already displayed in FIG. 2. Here, the presser 6 is shown as a linear compression device. The linear compression device may be, but not limited to, a hydraulic or pneumatic cylinder press. Further, the gas inlets 7 can be gleaned to be attached differently compared to FIG. 2 where they are mounted to the filter 5. Here they are instead arranged to the compartment 10, as disclosed in FIG. 3.

Figure 5:
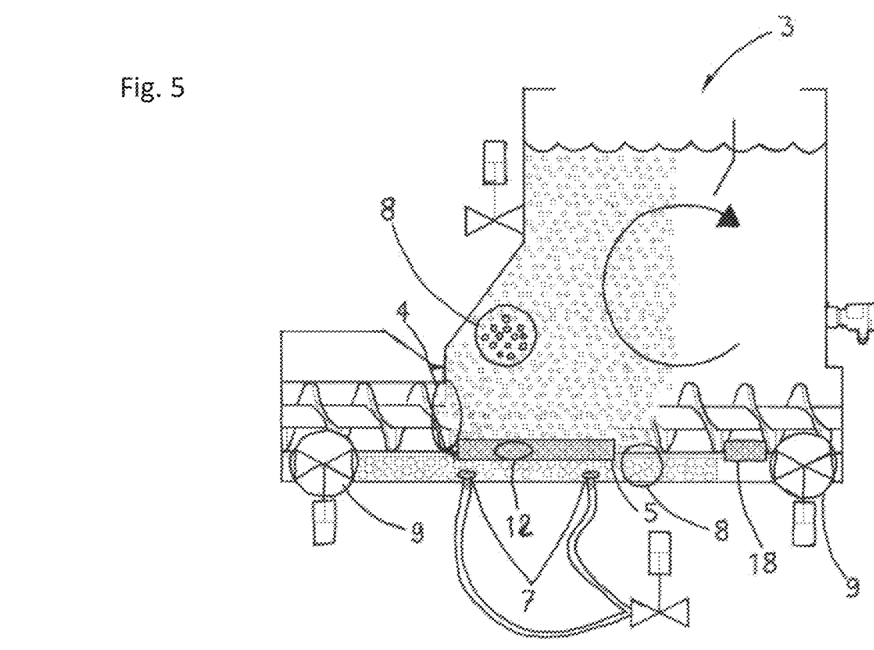
FIG. 5 is a cross sectional view of the separation device in FIG. 1 when generating gas bubbles.

FIG. 5 discloses a cross-sectional view of a separation device 1 while in operation generating gas bubbles 8. The arrangement of the separation device 1 is similar to the one previously disclosed and discussed in FIG. 3, showing a "first" filter 5 and a second filter 18 with separate water outlets 9, at least the water outlet 9 for the filter 5 being a water outlet valve 9, so that the compartment 10 except for the filter holes 12 can be made substantially gas tight when the valve 9 is closed. The second filter 18 may be a traditional filter without gas inlets. The second filter 18 is shown as a taking up a part of the remaining axial extension of the presser along the container. Preferably it may be extended along the full remaining axial extension besides the filter 5 for increased water filtration capacity.

The compartment 10 can be seen being filled with pressurized gas 8 displayed as bubbles. To be clear; the gas 8 does not actually form into bubbles until its ejected through the filter openings 12 into the contaminated water, but serve merely the purpose to show the principles of the separation device 1 as regards the otherwise invisible compressed gas.

In the container 2 the gas 8 has formed into bubbles 8. The bubbles 8, as previously explained, enhance the contaminant separation as contaminants are for example sinking faster or lifted to surface faster due to the generation of bubbles 8. The size of the bubbles may be determined by the size of the filter openings 12.

Moreover, the generation of bubbles 8 may cause the contaminated water to stir and even to circulate, here displayed as an arrow in circular shape inside the container 2. Such circulation both generates more contaminants to be drawn into the section with gas bubbles 8 where they are more efficiently separated, and affects where lighter contaminants gather at the surface making it easier to remove, further enhancing the whole separation process. The filter should be at least 5 cm wide in order to have an effect on the contaminant separation efficiency at all, but preferably it should have an extension of at least 10 cm to also promote at least some circulation of the contaminated water. The filter 5 may extend along substantially half of the available width along the axial extension of the presser 6 to achieve a high circulating affect. This could be particularly suitable in a context known to have a lot of lighter contaminants gathering at the surface.

The desirable gas bubble 8 size varies for example based on the mix of contaminants and for instance the purpose of the current step in the overall water treatment or cleaning process. In general, finer, i.e. normally smaller, gas bubbles generate a higher separating effect, especially to separate contaminants of different characteristics from each other, for instance heavy contaminants with lighter contaminants. Larger gas bubbles 8 lack the same separating effect, but are more efficient, typically earlier in the process, to allow larger contaminants to be separated. The bubble size 8 correlates with filter opening size 12, and the openings/bubble preferably should be in the range between 0.1-15 mm.

In the context of treating waste water, water needs to pass through the filter openings 12 efficiently, in order to maintain a high output, rendering almost no need to go below 0.1 mm in filter openings 12 size. The benefit of having bubbles 8 in the size of up to 15 mm is having a high water throughput, especially when treating contaminated water early in the process with relatively seen very large contaminants. This situation is not very common, so a 10 mm filter opening 12 size is usually sufficient in most cases to enable high water throughput although not letting through to big contaminants. Overall the most useful interval to use for filter openings 12 has so far been found to be between 0.1-5 mm. 0.1 mm as it is not too small making it difficult and expensive to manufacture, yet small enough to produce very fine gas bubbles 8 and allowing water to pass with only very fine contaminants remaining. 5 mm is in turn good as it is a good trade-off between separation productivity and filtering of contaminants. In other words, the 5 mm openings generate gas bubbles 8 with high separation efficiency, especially for allowing larger contaminants to quickly sink to the bottom, as well as ensuring high water throughput, while also filtering away much of the contaminants.

The shape of the filter openings 12 may be, but not limited to, rounded, like elliptical or circular, or angular, such as triangular, rectangular or square. Other shapes may be found preferable as well.

Figure 6:
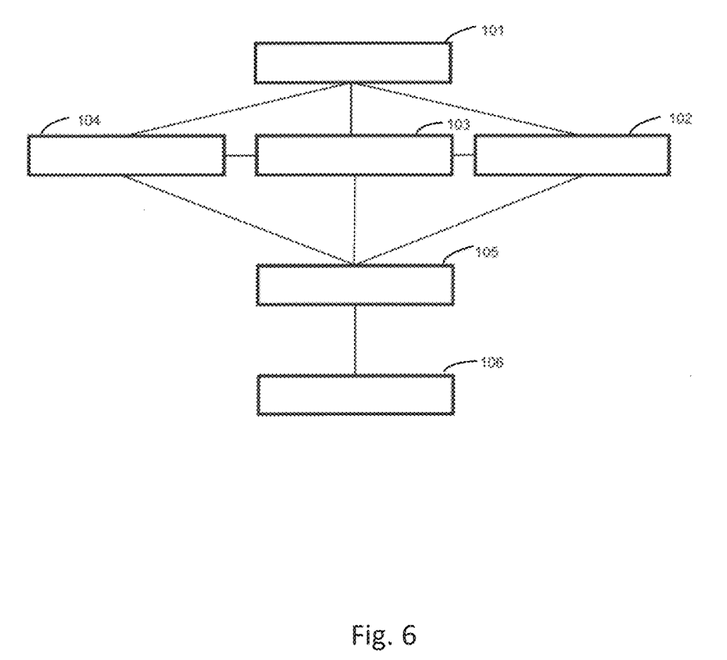
FIG. 6 is a flowchart of a method to separate contaminants from water according to the present disclosure.

FIG. 6 discloses a method according to the present disclosure of separating contaminants from contaminated water. The method comprises the steps of adding 101 contaminated water into the container 2, generating 102 gas bubbles 8 in the contaminated water, and compressing and/or dewatering 103 contaminants separated from the contaminated water. Further, the method may include a step of activating 104 the impeller 14 to break down and separate contaminants of different characteristics from the contaminated water. Further, the method may include a step of ejecting 105 contaminants gathered floating on a surface of the contaminated water.

The method may be performed by conducting the steps of generating 102 gas bubbles 8 in the contaminated water and the step of activating 104 and running the impeller 14 simultaneously. Further, the method may also be performed by conducting the step of compressing and/or dewatering 103 contaminants simultaneously with the earlier mentioned steps.

The method may further comprise a step of pressing 106 the separated water through a filter 5 and pressing separated contaminants through a contaminant outlet 4.

It should be understood that the present invention is not limited to the embodiments as described above and illustrated in the drawings. Rather, the skilled person will recognize that many changes and modifications may be made.

The invention claimed is:

1. A separation apparatus for separating contaminants from water comprising:
    a container (2) for receiving contaminated water, the container including a contaminated water inlet (3) and a first contaminant outlet;
    a filter (5) for separating contaminants from the contaminated water, the filter being located at a lower portion of the container (2);
    a water outlet (9) through which water which has passed through the filter (5) may flow;
    a screw or a linear compression device arranged within a lower portion of container (2) adjacent at least a portion of the filter (5) for compressing any contaminants accumulated on, or adjacent to the filter (5) and urging the accumulated contaminants towards and through the first contaminant outlet;
    at least one gas inlet (7) arranged to supply gas, through the filter (5) and into the container (2); and
    an actuator operably connected to the screw or linear compression device to cause movement thereof.

2. The separation apparatus according to claim 1, further comprising a compartment (10) located beneath the filter (5) and extending along at least part of the length of the bottom of the container (2).

3. The separation apparatus according to claim 2, wherein the water outlet (9) is in fluid communication with the compartment (10) and water which has passed through the filter (5) flows through the compartment (10) to the water outlet (9).

4. The separation apparatus according to claim 3, wherein the water outlet (9) comprises a valve.

5. The separation apparatus according to claim 1, further comprising a second contaminant outlet (11) for egress of any floating contaminants from the container (2), the second contaminant outlet (11) being located in an upper region of the container (2).

6. The separation apparatus according to claim 1, wherein the filter (5) has a plurality of filter openings in a size range of 0.1-15 mm.

7. The separation apparatus according to claim 1, wherein the filter (5) has a plurality of filter openings in a size range of 0.1-10 mm.

8. The separation apparatus according to claim 1, wherein the filter (5) has a plurality of filter openings in a size range of 0.1-5 mm.

9. The separation apparatus according to claim 1, further comprising an impeller (14) for stirring or agitating the contaminated water.

10. The separation apparatus according to claim 1, wherein the actuator is hydraulically powered.

11. The separation apparatus according to claim 1, wherein the actuator is pneumatically powered.

12. The separation apparatus according to claim 1, wherein the actuator is electrically powered.

13. The separation apparatus according to claim 1, wherein the screw includes brushing elements (21) on its outer circumference.

* * * * *